US008573068B2

(12) United States Patent
Van Cleve

(10) Patent No.: US 8,573,068 B2
(45) Date of Patent: Nov. 5, 2013

(54) METHOD AND APPARATUS FOR COUPLING A CASE TO A VIBRATING FLOW METER

(75) Inventor: Craig Brainerd Van Cleve, Lyons, CO (US)

(73) Assignee: Micro Motion, Inc., Boulder, CO (US)

( * ) Notice: Subject to any disclaimer, the term of this patent is extended or adjusted under 35 U.S.C. 154(b) by 191 days.

(21) Appl. No.: 13/320,889

(22) PCT Filed: Jun. 10, 2009

(86) PCT No.: PCT/US2009/046852
§ 371 (c)(1),
(2), (4) Date: Nov. 16, 2011

(87) PCT Pub. No.: WO2010/144083
PCT Pub. Date: Dec. 16, 2010

(65) Prior Publication Data
US 2012/0055261 A1    Mar. 8, 2012

(51) Int. Cl.
*G01F 1/84*    (2006.01)
(52) U.S. Cl.
USPC .................................................... 73/861.355
(58) Field of Classification Search
USPC ...................................... 73/861.355–861.357
See application file for complete search history.

(56) References Cited

U.S. PATENT DOCUMENTS

| 3,485,098 A | 12/1969 | Sipin |
| 5,386,732 A | 2/1995 | Scotto |
| 5,663,509 A | 9/1997 | Lew et al. |
| 5,996,225 A * | 12/1999 | Ollila et al. ................. 29/888.09 |
| 6,286,373 B1 * | 9/2001 | Lister et al. ............... 73/861.355 |
| 7,117,751 B2 * | 10/2006 | Berger et al. ............ 73/861.355 |
| 2001/0035055 A1 | 11/2001 | Drahm et al. |

FOREIGN PATENT DOCUMENTS

| RU | 1793234 A1 | 2/1993 |
| WO | 2007130024 A1 | 11/2007 |

* cited by examiner

*Primary Examiner* — Jewel V Thompson
(74) *Attorney, Agent, or Firm* — The Ollila Law Group LLC

(57) ABSTRACT

A vibrating flow meter (205) is provided. The vibrating flow meter (205) comprises a flow conduit (210) including a first end portion (211) and a second end portion (212). The vibrating flow meter (205) further includes a case (300) surrounding at least a portion of the flow conduit (210). The vibrating flow meter (205) also includes a first case connect (290). The first case connect (290) comprises a first portion (295) coupled to the first end portion (211) of the flow conduit (210) and one or more deformable members (292, 293, 294) extending radially from the first portion (295) and coupled to the case (300) such that the first end portion (211) can rotate about a conduit axis (X).

18 Claims, 4 Drawing Sheets

METHOD AND APPARATUS FOR COUPLING A CASE TO A VIBRATING FLOW METER

TECHNICAL FIELD

The present invention relates to, vibrating flow meters, and more particularly, to a method and apparatus for coupling a case to a vibrating flow meter.

BACKGROUND OF THE INVENTION

Vibrating flow meters such as, for example, densitometers and Coriolis flow meters are used for measuring a characteristic of flowing substances, such as, for example, density, mass flow rate, volume flow rate, totalized mass flow, temperature, and other information. Vibrating flow meters include one or more conduits, which may have a variety of shapes, such as, for example, straight, U-shaped, or irregular configurations.

The one or more conduits have a set of natural vibration modes, including, for example, simple bending, torsional, radial, and coupled modes. The one or more conduits are vibrated by at least one driver at a resonance frequency in one of these modes for purposes of determining a characteristic of the flowing substance. One or more meter electronics transmit a driver signal to the at least one driver, which is typically a magnet/coil combination, with the magnet typically being affixed to the conduit and the coil being affixed to a mounting structure or to another conduit. The driver signal causes the driver to vibrate the one or more conduits at the driver frequency in the driver mode. For example, the driver signal may be a periodic electrical current transmitted to the coil.

At least one pick-off detects the motion of the conduit(s) and generates a sinusoidal pick-off signal representative of the motion of the vibrating conduit(s). The pick-off is typically a magnet/coil combination, with the magnet typically being affixed to one conduit and the coil being affixed to a mounting structure or to another conduit. The pick-off signal is transmitted to the one or more electronics; and according to well known principals the pick-off signal may be used by the one or more electronics to determine a characteristic of the flowing substance or adjust the driver signal, if necessary.

Typically, vibrating flow meters are provided with two vibrating conduits that vibrate in opposition to each other in order to create an inherently balanced system. As a result, the vibrations from each conduit cancel each other out in a manner that prevents vibration or torque forces from being transmitted to any connecting structures. Likewise, when two vibrating conduits are used, vibrations of the mounting structure are canceled in the flow meter because the pick-offs generally measure only relative motion between the flow tubes, and externally induced vibrations tend to vibrate both tubes equally. There are, however, certain applications where dual conduits are undesirable, for example, due to problems with pressure drops or clogging. In such situations a single conduit system may be desirable.

However desirous a single conduit system may be, single conduit systems present inherent imbalance problems. Attempts at solving this problem have involved using a balancing structure, for example, a dummy tube or a balance bar, and using the motion of the balancing structure to balance out the system. Since, however, the overall mass of the tube, including the fluid within the tube, changes as the density of the fluid within the tube changes, these techniques by themselves have received limited success at eliminating imbalance problems.

FIG. 1 depicts a single conduit type vibrating flow meter according to the prior art. As shown, the flow meter includes a case 106 enclosing a balance bar 102. The balance bar 102 is cylindrical and encloses conduit 101. Conduit 101 has active portion 109 and inactive portions 110 and 110', which are defined by the connecting rings 103, 104 of the balance bar 102. The inactive portions 110, 110' extend beyond end elements 107, 108 of the case 106 to flanges (not shown). Conduit 101 has an input end 111 connected to an opening in case end 107 and an output end 112 connected to an opening in the case end 108.

In operation, conduit 101 and balance bar 102 are vibrated in phase opposition by a driver D. With substance flowing, the vibration of conduit 101 in this example induces a Coriolis response in conduit 101 that is detected by pick-off sensors LPO, RPO. The phase displacement between the pick-off sensors represents information pertaining to the flowing substance. The signal output of the velocity sensors is applied to meter electronics circuitry 125 via leads 122, 124 that processes the signals to derive the desired information pertaining to the flowing substance, such as for example a mass flow rate, a density, a viscosity, etc.

It is necessary that a vibrating flow meter provide accurate information over a wide range of operating conditions including substances of different density, temperature, and viscosity. In order to achieve this, it is desirable that the flow meter operate stably over a range of conditions. In order to achieve this stability, it is desirable for the flow meter vibrations to be isolated to the active conduit portion and balance system, because vibrations external to the vibratory system, whether induced by the vibrations of the flow meter or from another source, such as a pump, imposes additional accelerations on the flowing substance besides the Coriolis acceleration used to determine the fluid characteristics of the flowing substance. External vibration also repositions the nodes (area experiencing no motion) defining the active length of the conduit. This effect is difficult to compensate for and is subject to unknowable parameters such as the rigidity of the structure to which the meter is connected. Accordingly, undesired vibrations impede the ability of the flow meter to provide accurate output information regarding the flowing substance.

Prior art attempts at solving imbalance problems that arise due to changes in the density of the fluid involve adjusting the ratio of the vibration amplitude of the conduit relative to the vibration amplitude of the counterbalance structure. In balancing a structure, momentum is what is being balanced. Momentum is the product of mass and velocity, and velocity is proportional to vibration amplitude. Therefore, altering the vibration amplitude ratio alters meter balance. If, for example, the mass of a conduit (including the fluid located inside) and the mass of the counterbalance structure were initially equal and then the mass of the conduit were doubled (for example, as a result of a density increase in the fluid within the conduit), then reducing the amplitude of the conduit by half would restore balance to the conduit/counterbalance system. In practice, the combined amplitude of both the counterbalance structure and the conduit can be controlled by meter electronics. Accordingly, the conduit amplitude may be reduced to a lesser extent and the balance structure amplitude may be increased to some extent until in the above example, the ratio of the counterbalance amplitude relative to the conduit amplitude is 2:1.

The traditional method of adjusting the amplitude ratio as used in the prior art is to isolate the vibrating structure with a very soft (spring rate) mount. The idea is that a vibrating structure isolated in space is always balanced. For example if a spring joins two equal masses in space, such that when set vibrating out of phase with each other, the masses vibrate with equal amplitude and the spring has a motionless node half way between the masses. If one mass were to be increased and the masses were again set vibrating, the vibration amplitude of the increased mass would automatically decrease, and the vibration amplitude of the other mass would automatically increase to keep the momentum balanced. However, as a consequence, the new position of the node on the spring would relocate closer to the larger mass. The vibrating structure of a vibrating flow meter is similar, and node relocation is a problem.

Prior art flow meter designs that utilize self-balancing single tube meters are similar to a tuning fork wherein one tine is the active section of the flow tube, the other tine is the balance structure, and the handle is the inactive sections of the flow tube joining the active structure to the case. In this configuration, adding mass to one tine of the tuning fork decreases its amplitude and increases the amplitude of the other. The node, formerly at the junction of the two tines and the handle, relocates up the tine with the increased mass. The result is that the handle vibrates with the low-mass tine. If the vibrating handle is rigidly clamped, the vibration frequency rises, whereas if it is loosely clamped the frequency drops. This is a problem with flowmeters.

For the flow meter of FIG. 1, the vibrating system includes balance bar 102 and active conduit portion 109 which are vibrated in phase opposition. The ends of balance bar 102 and the conduit 101 are coupled by connecting rings 103, 104. Inactive tube portions 110, 110' extend unsupported from the connecting rings 103, 104 to the case ends 107, 108. These inactive tube portions correspond to the tuning fork handle. They are necessary and they are unsupported because they are the soft mounts that enable the amplitude change with density. However, they vibrate like the tuning fork handle when the density of the fluid is changed. This is undesirable since the vibration may cause the vibration of the case 103 and flanges 106. Because the vibration amplitude of the case 103 and flanges 106 is dependent upon the stiffness of the structure to which the meter is mounted, error of unknown magnitude can be induced in the flow measurement.

Adjusting the amplitude ratio in traditional method has an additional drawback in prior art meters in that it results in the repositioning of the motionless nodes that reside along the axis of the vibrating structure. The area between the nodes defines the active length of the conduit. The active length affects the measurement sensitivity. If the nodes relocate outwardly towards the case ends, the active length increases. The formerly inactive tube sections bend as a part of the vibration and that bending motion imparts Coriolis acceleration to the fluid. The additional Coriolis acceleration either adds to or subtracts from the sensitivity of the flow meter. Because the rigidity with which the meter is attached to the pipeline affects the amount of the additional Coriolis acceleration, there is no way to compensate for the relocation of the nodes. This relocation of the nodes further degrades the measurement accuracy.

There is however, one form of node relocation that does not change the meter sensitivity. If the inactive portions of the flow tube are constrained to rotation about their axes, the nodes can move up and down the axes without changing the Coriolis acceleration of the fluid. This is because the so-called inactive tube portion has to bend in order to create a Coriolis acceleration in the fluid. No tube bending means no sensitivity change despite node relocation. Until now, however, this principle has not been used in Coriolis flow meters. Therefore, there is a need in the art for a system that can couple the flow tube to its case in such a manner that the tube is left free to rotate about its axis, but is substantially prevented from changing the active tube length. The present invention overcomes this and other problems and an advance in the art is achieved.

SUMMARY OF THE INVENTION

A vibrating flow meter is provided according to an embodiment of the invention. The vibrating flow meter comprises a flow conduit. The flow conduit includes a first end portion and a second end portion. The vibrating flow meter also includes a case surrounding at least a portion of the flow conduit. The vibrating flow meter comprises a first case connect. The first case connect includes a first portion coupled to the first end portion of the flow conduit. The first case connect also includes one or more deformable members that extend radially from the first portion and are coupled to the case such that the first end portion can rotate about a conduit axis.

A case connect for a vibrating flow meter is provided according to an embodiment of the invention. The case connect comprises a first portion adapted to couple to at least a portion of a flow conduit. The case connect also comprises one or more deformable members. The deformable members extend radially from the first portion and are adapted to be coupled to a case.

A method for balancing a vibrating flow meter is provided according to an embodiment of the invention. The flow meter includes a flow conduit with a first end portion and a second end portion; and a case surrounding at least a portion of the flow conduit. The method comprises the step of coupling a first portion of a first case connect to the first end portion of the flow conduit. The method also comprises the step of coupling one or more deformable members that extend from the first portion of the first case connect to the case such that the first end portion can rotate about a conduit axis.

ASPECTS

According to an aspect of the invention, a vibrating flow meter comprises:
  a flow conduit including a first end portion and a second end portion;
  a case surrounding at least a portion of the flow conduit;
  a first case connect including:
    a first portion coupled to the first end portion of the flow conduit; and
    one or more deformable members extending radially from the first portion and coupled to the case such that the first end portion can rotate about a conduit axis.
Preferably, the vibrating flow meter further comprises:
  a second case connect including:
    a first portion coupled to the second end portion of the flow conduit; and
    one or more deformable members extending radially from the first portion and coupled to the case such that the second end portion can rotate about the conduit axis.
Preferably, the vibrating flow meter further comprises:
  a base coupled to the conduit and a driven member, the base switching between remaining substantially stationary or moving substantially in phase with the conduit or moving substantially in phase with the driven member in order to balance the motion of the conduit and the driven member.
Preferably, the vibrating flow meter further comprises:
  a pair of connectors that couple the base to the end portions of the conduit; and a pair of flanges coupled to the conduit, wherein the first and second case connects support the conduit between the flanges and the connectors.

Preferably, the one or more deformable members are adapted to limit motion of the flow conduit in a direction parallel to a plane of the deformable members and in a direction parallel to an axis of rotation of the flow conduit but allow the flow conduit to rotate about the axis of rotation.

Preferably, the one or more deformable members are separated by an angle α from one another, wherein the angle α is less than 180°.

Preferably, the first portion comprises a central hub adapted to receive at least a portion of the end portion of the flow conduit.

According to another aspect of the invention, a case connect for a vibrating flow meter, comprising:
a first portion adapted to couple to at least a portion of a flow conduit; and
one or more deformable members extending radially from the first portion and adapted to be coupled to a case.

Preferably, the one or more deformable members being separated by an angle α from one another, wherein the angle α is less than 180°.

Preferably, a deformable member of the one or more deformable members is configured to resist movement in a plane of the deformable member and partially deform upon movement in a direction perpendicular to the plane.

Preferably, the first portion comprises a central hub adapted to receive at least a portion of the end portion of the flow conduit.

According to another aspect of the invention, a method for balancing a vibrating flow meter including a flow conduit with a first end portion and a second end portion; and a case surrounding at least a portion of the flow conduit, comprises the steps of:
coupling a first portion of a first case connect to the first end portion of the flow conduit; and
coupling one or more deformable members that extend from the first portion of the first case connect to the case such that the first end portion can rotate about a conduit axis.

Preferably, the method further comprises the steps of:
coupling a first portion of a second case connect to the second end portion of the flow conduit; and
coupling one or more deformable members that extend from the first portion of the second case connect to the case such that the second end portion can rotate about the conduit axis.

Preferably, the method further comprises the step of:
coupling a base to the conduit and a driven member, the base switching between remaining substantially stationary or moving substantially in phase with the conduit or moving substantially in phase with the driven member in order to balance the motion of the conduit and the driven member.

Preferably, the method further comprises the step of:
coupling the base to the first and second end portion using a pair of connectors; and
coupling a pair of flanges to the conduit such that the first and second case connects support the conduit between the flanges and the connectors.

Preferably, the method further comprises the step of:
using the first case connect to limit the motion of the flow conduit in a direction parallel to a plane of the deformable members and in a direction parallel to an axis of rotation of the flow conduit but allow the flow conduit to rotate about the axis of rotation.

Preferably, the one or more deformable members are separated by an angle α from one another, wherein the angle α is less than 180°.

Preferably, the first portion comprises a central hub adapted to receive at least a portion of the end portion of the flow conduit.

DETAILED DESCRIPTION OF THE INVENTION

Figure 2:
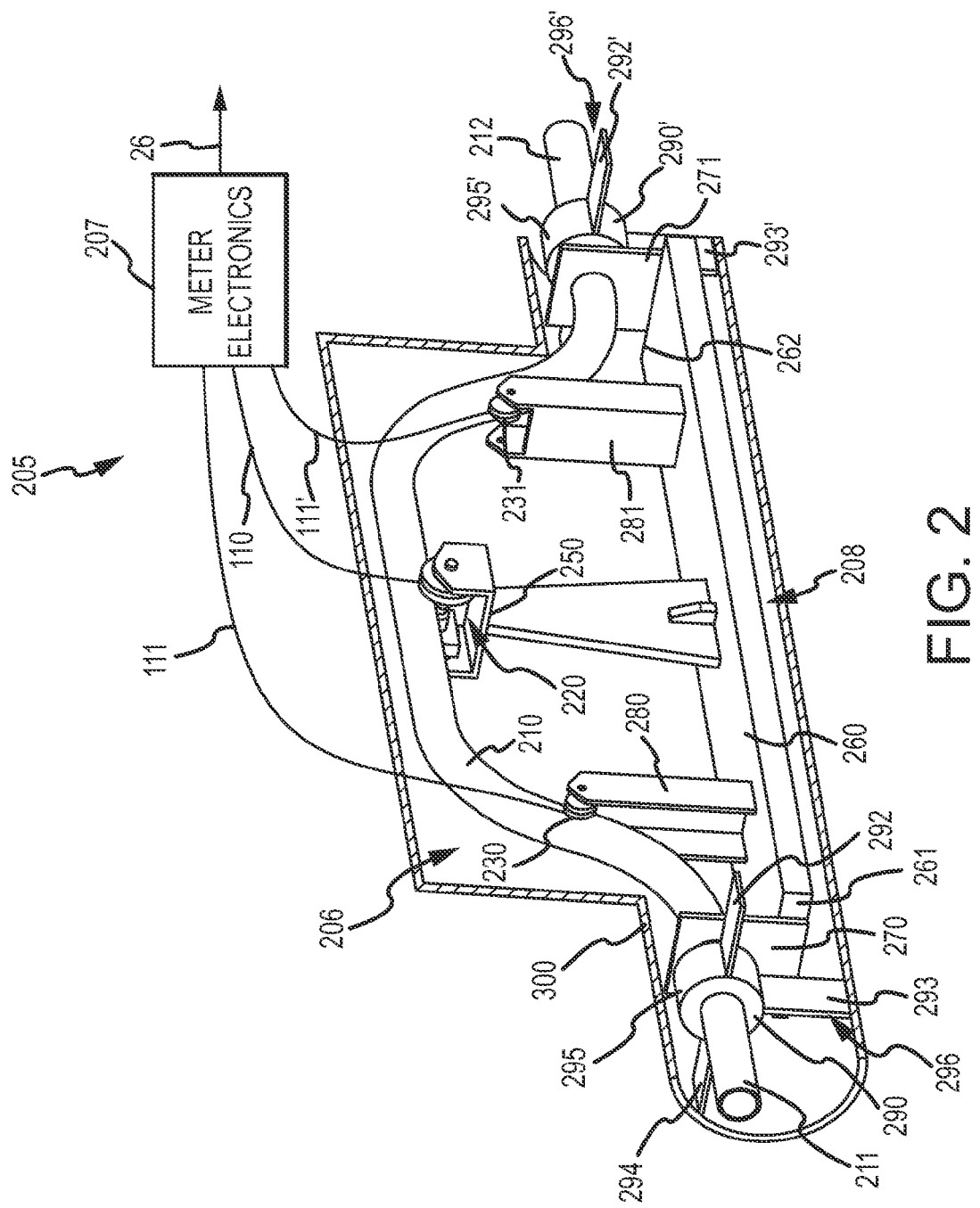
FIG. 2 shows a partial cross-sectional view of a flow meter according to an embodiment of the invention.
Figure 3:
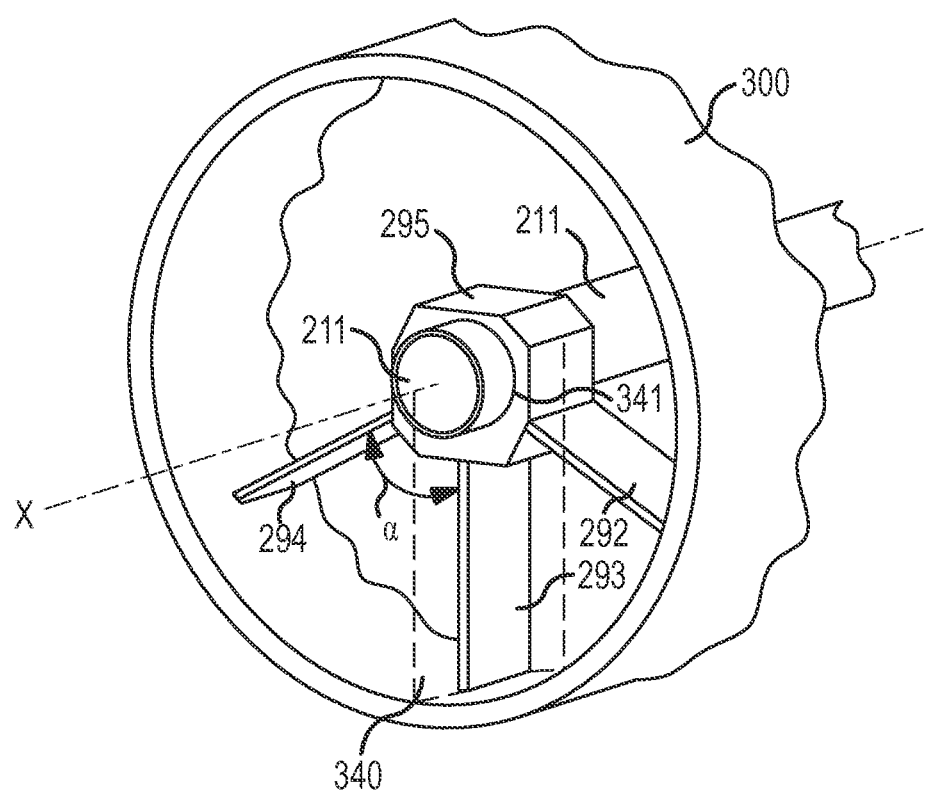
FIG. 3 shows an enlarged view of the case connect according to an embodiment of the invention.
Figure 4:
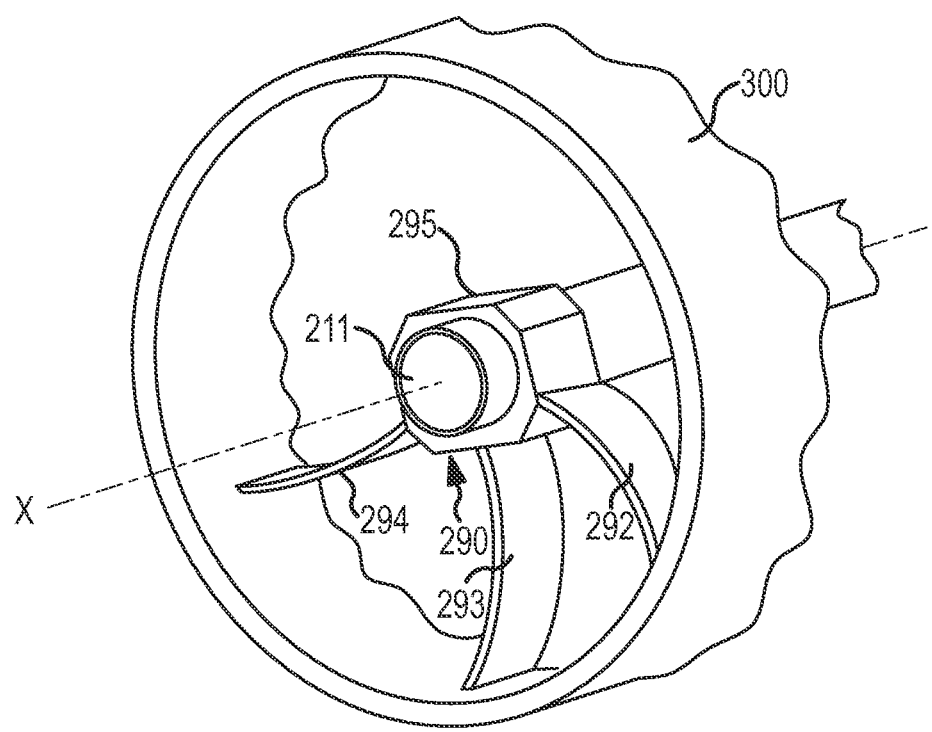
FIG. 4 shows an enlarged view of the case connect according to another embodiment of the invention.

FIGS. 2-4 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

FIG. 2 shows a partial cross-sectional view of a flow meter 205 according to an embodiment of the invention. The vibrating flow meter 205 shown is in the form of a Coriolis flow meter, comprising a sensor assembly 206, and a balance structure 208. The one or more meter electronics 207 are connected to sensor assembly 206 via leads 110, 111, 111' to measure a characteristic of a flowing substance, such as, for example, density, mass flow rate, volume flow rate, totalized mass flow, temperature, and other information. The meter electronics 207 can transmit the information to a user or other processor via lead 26.

Figure 1:
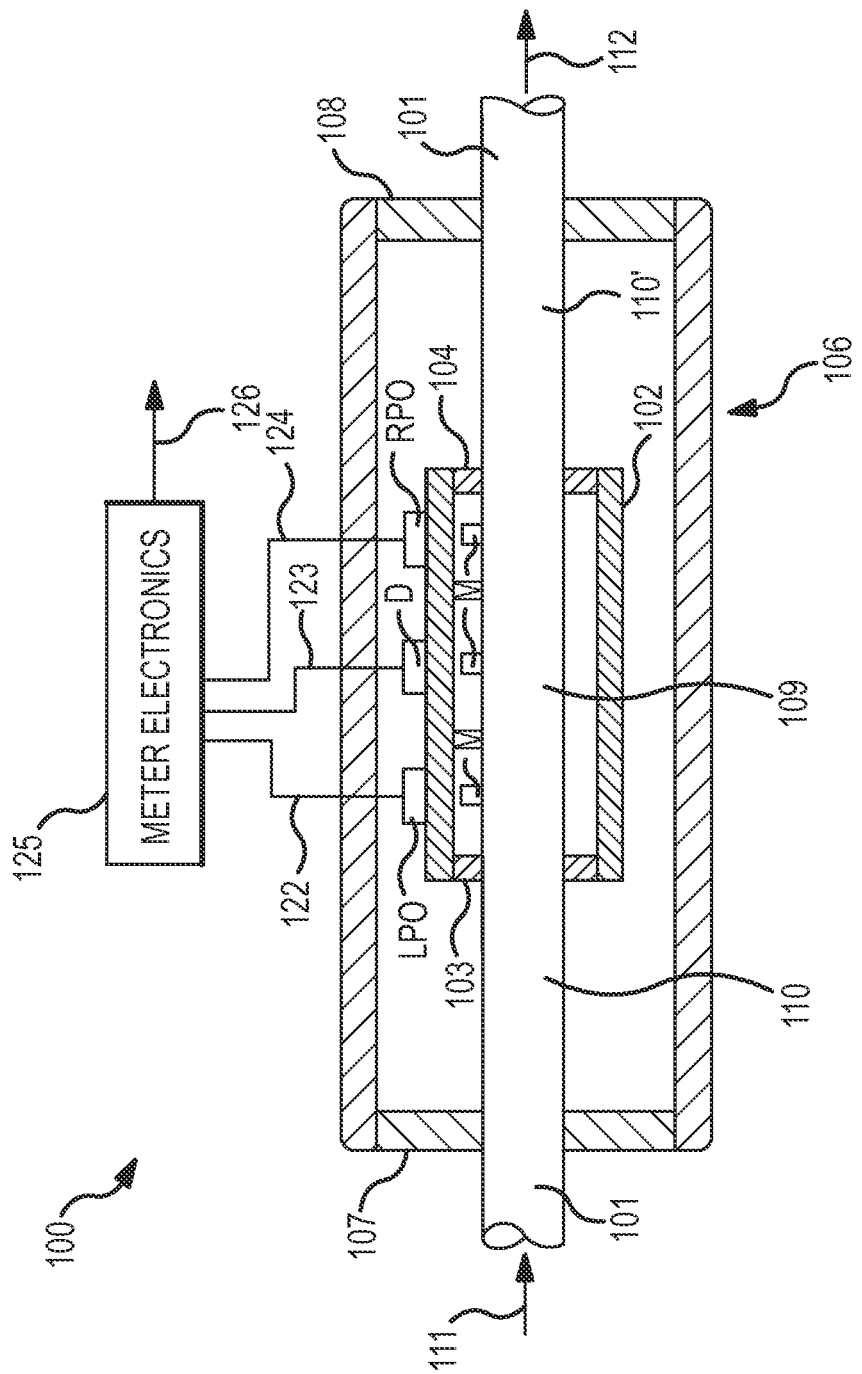
FIG. 1 shows a prior art single tube flow meter.

The sensor assembly 206 includes a conduit 210 that defines a flow path for receiving a flowing substance. The conduit 210 may be bent, as shown, or may be provided with any other shape, such as a straight configuration or an irregular configuration. When sensor assembly 206 is inserted into a pipeline system which carries the flowing substance, the substance enters sensor assembly 206 through an inlet flange (not shown), then it flows through the conduit 210, where a characteristic of the flowing substance is measured. Following this, the flowing substance exits the conduit 210 and passes through an outlet flange (not shown). Those of ordinary skill in the art appreciate that the conduit 210 can be connected to the flanges, such as flanges 106, shown in FIG. 1, via a variety of suitable means. In the present embodiment, the conduit 210 is provided with end portions 211, 212 that extend generally from connectors 270, 271 and connect to the flanges at their outer extremities.

The sensor assembly 206 of the present example includes at least one driver 220. The driver 220 includes a first portion connected to a driven member 250 of the balance structure 208 and a second portion connected to the conduit 210. The first and second portions may correspond to a drive coil and a drive magnet, for example. In the present embodiment, the driver 220 preferably drives the driven member 250 and conduit 210 in phase opposition. As shown in FIG. 3, the driven member 250 and conduit 210 are preferably driven about bending axis X, which is defined in part by the connectors 270, 271. According to an embodiment of the invention, the bending axis X corresponds to the inlet-outlet conduit axis. The driven member 250 bends from the base 260 and thus, does not have a stationary bending axis. The driver 220 may comprise one of many well known arrangements, including for example, and not limitation piezoelectric elements or an electromagnetic coil/magnet arrangement.

As shown in FIG. 2, the sensor assembly 206 includes at least one pick-off and in the present embodiment is shown provided with a pair of pick-offs 230, 231. According to one aspect of the present embodiment, the pick-offs 230, 231 measure the motion of the conduit 210. In the present embodiment, the pick-offs 230, 231 include a first portion located on respective pick-off arms 280, 281 and a second portion located on the conduit 210. The pick-off(s) may comprise one of many well known arrangements, including for example, and not limitation piezoelectric elements, capacitance elements, or an electromagnetic coil/magnet arrangement. Therefore, like the driver 220, the first portion of the pick-off may comprise a pick-off coil while the second portion of the pick-off may comprise a pick-off magnet. Those of ordinary skill in the art will appreciate that the motion of the conduit 210 is related to certain characteristics of the flowing substance, for example, the mass flow rate or density of the flowing substance through the conduit 210.

Those of ordinary skill in the art will appreciate that the one or more meter electronics 207 receive the pick-off signals from the pick-offs 230, 231 and provide a drive signal to the driver 220. The one or more electronics 207 can measure a characteristic of a flowing substance, such as, for example, density, mass flow rate, volume flow rate, totalized mass flow, temperature, and other information. The one or more electronics 207 may also receive one or more other signals from, for example, one or more temperature sensors (not shown), and one or more pressure sensors (not shown), and use this information to measure a characteristic of a flowing substance. Those of ordinary skill in the art will appreciate that the number and type of sensors will depend on the particular measured characteristic.

As shown in FIG. 2, the sensor assembly 206 may also include a case 300. The case 300 can be provided to surround and protect at least a portion of the flow conduit 210. The sensor assembly 206 may also include case connects 290, 290', which can be provided to couple the case 300 to the flow conduit 205. The case connects 290, 290' shown include a first portion 295, 295' coupled to the conduit 210 and a second portion 296, 296' coupled to the case 300. As shown, the case connects 290, 290' are preferably the only structures supporting the conduit 210 located between the flanges and the connectors 270, 271. It should be appreciated that while the case connects 290, 290' are shown in conjunction with the flow meter 205, the case connects 290, 290' may be implemented in prior art flow meters that lack the balancing structure 208 shown in FIG. 2. For example, the case connects 290, 290' could be implemented in the prior art flow meter 100 shown in FIG. 1.

According to one aspect of the present embodiment, the case connects 290, 290' are preferably configured to provide support for the vibrating system that is rigid in axial and transverse movement yet soft in torsional movement. As a result, according to an embodiment of the invention, the case connects 290, 290' can substantially retain the active flow conduit length. This may be accomplished by providing the case connects 290, 290' with deformable members 292, 292' 293, 293' 294, 294' for example, which extend radially with respect to the axis of the end portions 211, 212 of the conduit 210. Although three deformable members 292, 292' 293, 293', 294, 294' are provided in the embodiment shown, it should be appreciated that any number of deformable members may be utilized and the particular number of deformable members should not limit the scope of the present invention. The deformable members 292, 292' 293, 293', 294, 294' may be coupled to the conduit 210 in any manner, including, for example the first portion 295, 295' which may comprise a central hub 295, 295' coupled to the conduit 210 as in the embodiment shown. According to an embodiment of the invention, the central hub 295, 295' may be adapted to receive at least a portion of the flow conduit 210. More specifically, the central hub 295, 295' may be adapted to receive the end portions 211, 212 of the flow conduit 210.

The rigid translational and soft torsional coupling of the case connects 290, 290' provide at least two functions. First, by limiting the end portions 211, 212 to torsional movement, the case connects 290, 290' constrain the nodes to the end portion axes. While the nodes may relocate on the end portion axes, the movement of the tube end portions is constrained by the case connects to rotation about their axes. The case connects thus limit measurement errors associated with node relocations. Secondly, by allowing the end portions 211, 212 freedom to rotate, the vibrating structure is supported torsionally in a very soft manner. The soft torsional mount enables the amplitude ratio of the conduit 210 and balance structure 208 to change with fluid density and enables the self-balancing feature of the present invention. The combination of these two features operates to retain the active flow conduit length despite variations in fluid density. The operation of the case connects 290, 290' is explained in more detail below.

FIG. 3 shows an enlarged view of the case connect 290 coupled to the flow tube 210 and the case 300 according to an embodiment of the invention. Although the discussion below is limited to the case connect 290, it should be appreciated that the case connect 290' operates according to the same principals and therefore a separate discussion of the operation of the case connect 290' is omitted. Some of the components of the flow meter 205 have been removed from FIG. 3 to simplify the figure. For example, the connector 270 and balance structure 208 are not shown in FIG. 3. It should be appreciated that in operation, the end portion 211 of the conduit 210 may extend out from the case 300 and case connect 290 further than illustrated. Although the figure is simplified, it should be appreciated that in operation, the components shown in FIG. 2, but not shown in FIGS. 3 & 4 will typically be included. Furthermore, FIGS. 3 & 4 only show the portion of the conduit 210 and case 300 coupled to the case connect 290. It should be appreciated that the case 300 in operation may substantially surround the entire vibrating flow tube 210 as shown in FIG. 2. As can be seen, the case connect 290 couples the flow tube 210, and more particularly, the end portion 211 of the flow tube 210 to the case 300. Advantageously, the case connect 290 retains the flow tube 210 in the desired position with respect to the case 300 using the one or more deformable members 292, 293, 294.

According to an embodiment of the invention, the first portion 295 of the case connect 290 is adapted to receive at least a portion of the flow conduit 210. More particularly, the first portion 295 is adapted to receive at least a portion of the end portion 211 of the flow conduit 210. The first portion 295 may be coupled to the end portion 211 in a variety of ways including, but not limited to, brazing, bonding, welding, adhesives, mechanical fasteners, etc. In the embodiment shown, the first portion 295 comprises a central hub 295; however, it should be appreciated that other configurations are contemplated. For example, in other embodiments, the deformable members 292, 293, 294 can be coupled directly to the end portion 211 with the end of the deformable members 292, 293, 294 comprising the first portion 295. In embodiments where the first portion 295 comprises a central hub 295, the central hub 295 can include an opening 341 adapted to receive at least a portion of the end portion 211.

In the embodiment shown in FIG. 3, each deformable member 292, 293, 294 is separated from the next deformable member 292, 293, 294 by an angle α. It should be appreciated that the angle α may comprise approximately 90° as shown in FIG. 2, or may comprise some angle other than 90° as in FIGS. 3 & 4. The particular angle α chosen may also depend on the number of deformable members provided in the particular case connect 290. Therefore, it should be appreciated that the particular angle α separating the deformable members 292, 293, 294 should not limit the scope of the present invention. However, it should also be appreciated that if the angle α is approximately 180° and the case connect 290 only comprises one or two deformable members, the ability of the deformable members to limit translational movement may be substantially reduced. This is because with only two opposing deformable members, rotation would not be the only type of movement that would be perpendicular to the plane of both deformable members. Rather, the flow conduit 210 could move a substantial amount, which could disadvantageously allow the end portions to bend and impair the accuracy of the flow meter. The orientation of the deformable members is important in determining whether the translational movement will affect the measurements. For example, in the embodiment shown in FIG. 2, if the deformable member 293 were removed, the end portion 211 would be free to move in a vertical direction because the planes of the deformable members 292, 294 are substantially parallel. Therefore, the tube ends 211, 212 could bend in the vertical plane and apply additional Coriolis forces to the fluid. However, this vertical movement may not affect the meter's measurements because the pick-off sensors 230, 231 do not measure movement in this direction. In contrast, if the case connect 290 shown in FIG. 2 were rotated by approximately 90° and the deformable member 293 were removed, then the parallel deformable members 292, 294 could allow the tube ends 211, 212 to bend in the horizontal plane. Because the pick-off sensors 230, 231 do measure movement in this direction, horizontal translation of the tube ends 211, 212 could affect the meter accuracy by generating additional Coriolis forces. However, with the third deformable member 293 provided, this horizontal movement can be substantially eliminated. In contrast, with the configuration shown in FIGS. 3 & 4 where the deformable members 292, 294 are separated by an angle less than 180°, the third deformable member 293 could be removed and the case connect 290 could retain its functionality.

According to an embodiment of the invention, with the central hub 295 coupled to the flow conduit 210 and the deformable members 292, 293, 294 extending from the central hub 295 and coupled to the case 300, the flow conduit 210 can be held securely in place with respect to the case 300. This is because a single deformable member can substantially prevent the end portion 211 of the conduit 210 from moving parallel to the plane of the deformable member. This is because such motion would require the deformable member to stretch or compress. Take for example, the deformable member 293 that is substantially vertical in FIG. 3 with a plane 340 that is shown extending to the end portion 211 for illustrative purposes. The deformable member 293 can substantially prevent the end portion 211 from moving in a vertical direction as shown in FIG. 3 because downward movement would require the deformable member 293 to compress and upward movement would require the deformable member 293 to stretch. Typically, the forces applied to the end portions 211, 212 of the flow conduit 210 are not great enough to overcome the strength of the deformable members to stretch or compress the deformable members. It should be appreciated that the particular directions described above correspond to the directions shown in FIG. 3 and therefore, the applicability of the orientations of "up" and "down" will depend upon the particular orientation of the flow meter once installed.

In addition, the deformable members 292, 292' 293, 293', 294, 294' can substantially prevent the end portions 211, 212 from moving in the axial direction of the end portions 211, 212. Movement in this direction would need to overcome the coupling force between the deformable members 292, 292' 293, 293', 294, 294' and the case 300 or between the conduit 210 and the central hub 295, 295' or between the central hub 295, 295' and the deformable members 292, 292' 293, 293', 294, 294'. In some embodiments, the deformable members 292, 292' 293, 293', 294, 294' are held by friction; however, in other embodiments, the case connects 290, 290' may be coupled using additional methods such as brazing, bonding, welding, adhesives, mechanical connectors, etc. Therefore, in these embodiments, in order for the conduit 210 to move in the axial direction of the end portions 211, 212, i.e., parallel to the axis X and also parallel to the plane of the deformable members 292, 292' 293, 293', 294, 294', a force would be required that could overcome the force coupling the case connects 290, 290' to the end portions 211, 212 and the case 300. Often, the vibrational forces experienced by the flow meter 205 are not great enough to overcome these coupling forces.

With more than one deformable member provided at an angle from the first deformable member, the additional deformable members can likewise substantially prevent the conduit 210 from moving parallel to the plane of the additional deformable members. Therefore, the conduit 210 is substantially prevented from moving parallel to the plane of the deformable member 292, 292' 293, 293', 294, 294'. Furthermore, the deformable members 292, 292' 293, 293', 294, 294' can substantially prevent the conduit 210 from moving in the axial direction of the conduit 210. However, the conduit 210 is left free to move perpendicular to the deformable member, i.e., rotate about the conduit axis X. This is possible due to the resiliency of the deformable members 292, 292' 293, 293', 294, 294'. This is shown further in FIG. 4.

FIG. 4 shows an enlarged view of the case connect 290 according to an embodiment of the invention. In the embodiment shown, the end portion 211 of the flow conduit 210 has rotated in the counter-clockwise direction. For clarity the rotation amount has been greatly exaggerated. Because the central hub is coupled to the end portion 211, the central hub has also rotated. This rotation may be due to a change in fluid density, for example. Because the deformable members 292, 293, 294 are coupled to both the central hub 295 and the case 300, the deformable members 292, 293, 294 have partially deformed due to the rotation of the central hub 295. According to an embodiment of the invention, the deformable members 292, 293, 294 may be formed from a thin metal sheet, for example. This may provide sufficient strength along the plane of the deformable member yet sufficient flexibility to allow the end portion 211 of the flow conduit 210 to rotate. It should be appreciated that the deformable members 292, 293, 294 could be formed from other materials, such as certain polymers. Those skilled in the art will readily recognize other suitable materials and therefore, the particular examples provided should in no way limit the scope of the present invention. It should be appreciated that the deformable members 292, 292' 293, 293', 294, 294' can be formed such that they are resilient so as to return to their original shape upon the end portions 211, 212 and the first portion central hub 295, 295' returning to their original position. This elastic deformation allows the deformable members 292, 292' 293, 293', 294, 294' to permit rotation of the central hub 295, 295' and therefore, the flow conduit 210 in either direction.

The deformation of the deformable members 292, 293, 294 provides a number of advantages. One advantage is that the end portion 211 of the flow conduit 210 may rotate due to a change in fluid density, for example. According to an embodiment of the invention, the flow meter 205 may be configured such that the node is located at the junction of the flow conduit 210 and the balance structure 208 with a fluid density of approximately 1 g/cm$^3$. If a more dense fluid flows through the flow conduit 210 than originally balanced for, the conduit vibration amplitude will decrease while the balance structure 208 vibration amplitude will increase. These changes in vibration amplitude allow the flow meter 205 to remain balanced despite a change in fluid density. In this situation, the end portions 211, 212 will rotate with the balance structure 208 and the nodes will move out along the axis of the end portions 211, 212. In prior art flow meters, this node relocation caused measurement errors because the end portions were allowed to bend. However, in the present invention, the node relocation does not create measurement errors, because the movement in the end portions 211, 212 is limited to purely rotational movement. According to an embodiment of the invention, this node motion will not impact the active flow conduit length because the pure rotation of the conduit 210 about its axis does not generate Coriolis forces. Conversely, if the fluid density drops, the flow conduit vibration amplitude will increase and the balance structure vibration amplitude will decrease to once again restore the meter balance. In this situation, the end portions 211, 212 will instead rotate with the flow conduit 210 rather than the balance structure 208.

Therefore, it can be appreciated that the case connects 290, 290' can limit the motion of the end portions 211, 212 of the flow conduit 210 to rotation about the axis X. This limitation of movement is provided by the soft rotational mounting conditions provided by the case connects 290, 290'. In order for the flow conduit 210 and the balance structure 208 to adjust their amplitude ratio by self-balancing, they should be suspended in a very soft mount. Prior art soft mounts did not limit the movement to rotational movement as in the present invention. Therefore, the node relocation could affect meter performance. According to the present invention, the active portion of the flow conduit 210 and the balance structure 208 are designed so that the vibrating structure is balanced in substantially all translational directions with a fluid density of approximately 1 g/cm$^3$. When the fluid density changes, translation forces are small, and the motions are easily suppressed by the mass of the case 300 via the deformable members 292, 292' 293, 293', 294, 294'. The other significant motion created by varying densities is rotation of the end portions 211, 212. The end portions 211, 212 are also coupled to the flanges (not shown). Thus, the end portions 211, 212 comprise a long torsion spring extending from the active portion of the flow conduit 210 to the flange face. The length of this spring allows for a sufficiently soft mounting structure for the vibrating structure to be essentially self-balancing. Its length also allows relatively little torque to be transmitted to the flanges from the vibrating conduit 210.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention.

Thus, although specific embodiments of, and examples for, the invention are described herein for illustrative purposes, various equivalent modifications are possible within the scope of the invention, as those skilled in the relevant art will recognize. The teachings provided herein can be applied to other vibrating flow meters, and not just to the embodiments described above and shown in the accompanying figures. Accordingly, the scope of the invention should be determined from the following claims.

I claim:

1. A vibrating flow meter (205), comprising:
    a flow conduit (210) including a first end portion (211) and a second end portion (212);
    a case (300) surrounding at least a portion of the flow conduit (210);
    a first case connect (290) including:
        a first portion (295) coupled to the first end portion (211) of the flow conduit (210); and
        one or more deformable members (292, 293, 294) extending radially from the first portion (295) and coupled to the case (300) such that the first end portion (211) can rotate about a conduit axis (X).

2. The vibrating flow meter (205) of claim 1, further comprising:
    a second case connect (290') including:
        a first portion (295') coupled to the second end portion (212) of the flow conduit (210); and
        one or more deformable members (292', 293', 294') extending radially from the first portion (295') and coupled to the case (300) such that the second end portion (212) can rotate about the conduit axis (X).

3. The vibrating flow meter (205) of claim 2, further comprising:
    a base (260) coupled to the conduit (210) and a driven member (250), the base (260) switching between remaining substantially stationary or moving substantially in phase with the conduit or moving substantially in phase with the driven member (250) in order to balance the motion of the conduit (210) and the driven member (250).

4. The vibrating flow meter (205) of claim 3, further comprising:
    a pair of connectors (270, 271) that couple the base (260) to the end portions (211, 212) of the conduit (210); and
    a pair of flanges (106) coupled to the conduit (210), wherein the first and second case connects (290, 290') support the conduit (210) between the flanges (106) and the connectors (270, 271).

5. The vibrating flow meter (205) of claim 1, wherein the one or more deformable members (292, 293, 294) are adapted to limit motion of the flow conduit (210) in a direction parallel to a plane of the deformable members (292, 293, 294) and in a direction parallel to an axis of rotation (X) of the flow conduit (210) but allow the flow conduit (210) to rotate about the axis of rotation (X).

6. The vibrating flow meter (205) of claim 1, wherein the one or more deformable members (292, 293, 294) are separated by an angle α from one another, wherein the angle α is less than 180°.

7. The vibrating flow meter (205) of claim 1, wherein the first portion (295) comprises a central hub adapted to receive at least a portion of the end portion (211) of the flow conduit (210).

8. A case connect (290) for a vibrating flow meter (205), comprising:
   a first portion (295) adapted to couple to at least a portion of a flow conduit; and
   one or more deformable members (292, 293, 294) extending radially from the first portion (295) and adapted to be coupled to a case (300).

9. The case connect (290) of claim 8, wherein the one or more deformable members (292, 293, 294) being separated by an angle $\alpha$ from one another, wherein the angle $\alpha$ is less than 180°.

10. The case connect (290) of claim 8, wherein a deformable member of the one or more deformable members is configured to resist movement in a plane of the deformable member and partially deform upon movement in a direction perpendicular to the plane.

11. The case connect (290) of claim 8, wherein the first portion (295) comprises a central hub adapted to receive at least a portion of the end portion (211) of the flow conduit (210).

12. A method for balancing a vibrating flow meter including a flow conduit with a first end portion and a second end portion; and a case surrounding at least a portion of the flow conduit, comprising the steps of:
   coupling a first portion of a first case connect to the first end portion of the flow conduit; and
   coupling one or more deformable members that extend from the first portion of the first case connect to the case such that the first end portion can rotate about a conduit axis.

13. The method of claim 12, further comprising the steps of:
   coupling a first portion of a second case connect to the second end portion of the flow conduit; and
   coupling one or more deformable members that extend from the first portion of the second case connect to the case such that the second end portion can rotate about the conduit axis.

14. The method of claim 13, further comprising the step of:
   coupling a base to the conduit and a driven member, the base switching between remaining substantially stationary or moving substantially in phase with the conduit or moving substantially in phase with the driven member in order to balance the motion of the conduit and the driven member.

15. The method of claim 14, further comprising the step of:
   coupling the base to the first and second end portion using a pair of connectors; and
   coupling a pair of flanges to the conduit such that the first and second case connects support the conduit between the flanges and the connectors.

16. The method of claim 12, further comprising the step of:
   using the first case connect to limit the motion of the flow conduit in a direction parallel to a plane of the deformable members and in a direction parallel to an axis of rotation of the flow conduit but allow the flow conduit to rotate about the axis of rotation.

17. The method of claim 12, wherein the one or more deformable members are separated by an angle $\alpha$ from one another, wherein the angle $\alpha$ is less than 180°.

18. The method of claim 12, wherein the first portion comprises a central hub adapted to receive at least a portion of the end portion of the flow conduit.

* * * * *